(12) United States Patent
Chen et al.

(10) Patent No.: US 7,096,356 B1
(45) Date of Patent: Aug. 22, 2006

(54) METHOD AND APPARATUS FOR NEGOTIATING DIFFIE-HELLMAN KEYS AMONG MULTIPLE PARTIES USING A DISTRIBUTED RECURSION APPROACH

(75) Inventors: Shigang Chen, Santa Clara, CA (US); Liman Wei, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 09/894,721

(22) Filed: Jun. 27, 2001

(51) Int. Cl.
*H04L 9/00* (2006.01)

(52) U.S. Cl. .............................. 713/163; 726/6; 380/44

(58) Field of Classification Search ................ 713/163, 713/162, 150
See application file for complete search history.

(56) References Cited

U.S. PATENT DOCUMENTS

| | | | | |
|---|---|---|---|---|
| 4,845,744 | A * | 7/1989 | DeBenedictis | 379/88.22 |
| 4,881,264 | A * | 11/1989 | Merkle | 713/177 |
| 4,937,811 | A * | 6/1990 | Harris | 370/200 |
| 5,471,580 | A * | 11/1995 | Fujiwara et al. | 709/249 |
| 5,592,552 | A * | 1/1997 | Fiat | 713/163 |
| 5,634,011 | A * | 5/1997 | Auerbach et al. | 709/242 |
| 5,748,736 | A * | 5/1998 | Mittra | 713/163 |
| 5,754,659 | A * | 5/1998 | Sprunk et al. | 380/30 |
| 6,049,878 | A * | 4/2000 | Caronni et al. | 713/201 |
| 6,058,420 | A * | 5/2000 | Davies | 709/224 |
| 6,134,599 | A * | 10/2000 | Chiu et al. | 709/252 |
| 6,195,751 | B1 * | 2/2001 | Caronni et al. | 713/163 |
| 6,240,188 | B1 * | 5/2001 | Dondeti et al. | 380/284 |
| 6,263,435 | B1 * | 7/2001 | Dondeti et al. | 713/163 |
| 6,295,361 | B1 * | 9/2001 | Kadansky et al. | 380/278 |
| 6,327,252 | B1 * | 12/2001 | Silton et al. | 370/256 |
| 6,363,154 | B1 * | 3/2002 | Peyravian et al. | 380/283 |
| 6,684,331 | B1 * | 1/2004 | Srivastava | 713/163 |
| 6,701,434 | B1 * | 3/2004 | Rohatgi | 713/168 |
| 6,751,659 | B1 * | 6/2004 | Fenger et al. | 709/223 |
| 6,826,687 | B1 * | 11/2004 | Rohatgi | 713/171 |

OTHER PUBLICATIONS

Caronni et al., Efficient security for large and dynamic multicast groups, Jun. 1998, International Workshops on Enabling Technologies: Infrastructure for Collaborative Enterprises, Page(s):376-383.*

(Continued)

*Primary Examiner*—Ayaz Sheikh
*Assistant Examiner*—David Garcia Cervetti
(74) *Attorney, Agent, or Firm*—Hickman Palermo Truong & Becker LLP

(57) ABSTRACT

A method and apparatus for negotiating a shared secret among members of a multicast group are disclosed. A tree that represents the group is created and stored in a memory. Each node of the tree is associated with a group member. The shared secret is generated by traversing the tree in post-order, and at each node of the tree, recursively generating a partial key value for use in the shared secret and a base value for use in subsequent recursive partial key value generation. At each node, a partial key value is computed by accumulating the exponent portion of the Diffie-Hellman key equation and computing a new base value for use in subsequent computations. If a particular node has a left or right child sub-tree, each sub-tree is also recursively traversed in post-order fashion. When traversal of the entire tree is complete, all nodes have the shared secret key.

31 Claims, 8 Drawing Sheets

OTHER PUBLICATIONS

Perrig et al., ELK, a new protocol for efficient large-group key distribution, May 2001, IEEE, pp. 247-262.*
Stoica et al., REUNITE: a recursive unicast approach to multicast, Mar. 2000, INFOCOM 2000. Nineteenth Annual Joint Conference of the IEEE Computer and Communications Societies. vol. 3, 26-30 Page(s):1644-1653 vol. 3.*
Steiner et al., Diffie-Hellman Key Distribution Extended to Group Commnunciation, 1996, ACM, pp. 31-37.*
Kim et al., Simple and fault-tolerant key agreement for dynamic collaborative groups, Nov. 2000, ACM, pp. 235-244.*
Suvo Mittra, lolus: a framework for scalable secure multicast, 1997, ACM, pp. 277-288.*
Waldvogel et al., The VersaKey framework: Versatile Group Key Management, Sep. 1999, IEEE, pp. 1614-1631.*
Klinker, J.E., Multicast tree construction in directed networks, Oct. 1996, Military Communications Conference, 1996. MILCOM '96, Conference Proceedings, IEEE, vol. 2, Page(s):496-500 vol. 2.*
Kim et al., Simple and fault-tolerant key agreement for dynamic collaborative groups, Nov. 2000, ACM, pp. 235-244.*
S. Setia et al., "Kronos: A Scalable Group Re-Keying Approach for Secure Multicast," Proc. Of 2000 IEE Symposium on Security & Privacy, 2000., pp. 1-14.
T. Hardjono et al., "Intra-Domain Group Key Management Protocol," IETF Internet-Draft, Sep. 2000, pp. 1-30.
D. Harkins et al., "The Internet Key Exchange (IKE)," IETF RFC 2409, Nov. 1998.
H. Harney et al., "Group Secure Association Key Management Protocol," IETF Internet-Draft, Jun. 2000.
H. Harney et al., "Group Key Management Protocol (GKMP) Architecture," IETF RFC 2094, Jul. 1997.
H. Harney et al., "Group Key Management Protocol (GKMP) Specification," IETF RFC 2093, Jul. 1997.
S. Kent et al., "Security Architecture for the Internet Protocol," IETF RFC 2401, Nov. 1998.

* cited by examiner

METHOD AND APPARATUS FOR NEGOTIATING DIFFIE-HELLMAN KEYS AMONG MULTIPLE PARTIES USING A DISTRIBUTED RECURSION APPROACH

FIELD OF INVENTION

The present invention relates to data processing in the field of security and encryption for networked computer systems. The invention relates more specifically to a distributed recursion approach for negotiating Diffie-Hellman keys among multiple parties.

BACKGROUND OF THE INVENTION

There are many known ways to protect data communications between two parties. For example, the Secure Internet Protocol (IPSec) standards may be used, as defined in the Internet Drafts that are available at the "html.charters/ipsec-charter.html" document of the Internet Engineering Task Force Web site at "ietf" dot "org". IPSec implementation is generally described in the latest version of the "Security Architecture for the Internet Protocol" Internet Draft (draft-ietf-arch-sec-xx.txt). An earlier version of IPSec is described in RFCs 1825 through 1829.

Numerous firewall products, such as Cisco IOS and Cisco PIX Firewall, support the IPSec standards. However, protection of communication among multiple parties is a more difficult problem and there are fewer established solutions.

Achieving secure multi-party communication has become more important as more multimedia information has begun to move across public data networks. Video and audio traffic consumes far more resources, such as bandwidth, buffer space, and processing power, than conventional data traffic. To avoid congestion at traffic routing points and reduce processing load at data sources, multicasting is often used to efficiently deliver traffic to a group of nodes. Secure communication is a requirement for network services that use multicasting, such as confidential tele-conferencing, broadcasting customer information, and distribution of video to subscribers.

In one security approach, each data packet in a multicast session is encrypted at the data source with a security key that is shared by all group members. For the purpose of efficiency, members who are participating in a multicast group are required to use the same session key to decrypt data packets that carry the multicast information. This approach is used because it requires each data packet to be encrypted only once. The encrypted packet is then delivered to each group member, which uses the same key to decrypt the packet.

During the course of the multicast, group members may join or depart, resulting in re-formation of the group. To ensure that departed group members cannot continue to obtain multicast information, and to ensure that joining group members can, establishment of a new shared session key for use by the re-formed group is required. Thus, an important technical problem involves how to establish and re-establish a shared session key for communication among all participants.

Among two parties, "pairwise" session keys can be negotiated either through a trusted agent or directly between the two participants. When negotiation occurs through a trusted agent, a public key exchange can be used, such as Diffie-Hellman key exchange. Each participant establishes a secure channel with the trusted agent and negotiates or retrieves the pairwise session key over the secure channel. When negotiation occurs directly between two participants, several approaches may be used. A public key exchange may be used; alternatively, a pre-determined secret "mega" key is shared by the parties and used in periodic re-negotiation of pairwise session keys.

These approaches can be applied to multi-party key negotiation. In one application, each of the members of a multicast group establishes a different pairwise key with a group controller. As a result, each group member sets up a different secure communication channel with the group controller. Thereafter, group members can negotiate and re-negotiate new session keys with the group controller using their respective secure communication channels.

For example, pairwise keys are negotiated between a session controller node and all participants in H. Harney et al., "Group Key Management Protocol Architecture, RFC 2094, September 1994, and H. Harney et al., "Group Key Management Specification," RFC 2093, September 1994. In D. Wallner et al., "Key Management for Multicast: Issues and Architectures, RFC 2627, June 1999, additional keys are used to form a logical hierarchy of secure communication, where the session controller can use a single key to talk to a sub-group of participants. In H. Harney et al., "Group Secure Association Key Management Protcool," Internet-Draft "draft-harney-sparta-gsakmp-sec-02.txt," June 2000, the underlying Security Associations (SA's) between the group controller and the members are assumed to exist. The SA's are established by protocols such as ISAKMP, IPSec, etc., and use pairwise shared keys.

Further, in T. Hardjono et al., "Intra-Domain Group Key Management Protocol," Internet-Draft "draft-ietf-ipsec-in-tragkm-02.txt," February 2000, the group key is delivered using a two-level hierarchy. Each participant is assumed to have established an SA and a shared key with an Area Key Distributor (AKD) of the area in which the participant resides, and each AKD is assumed to have established an SA and a shared key with the Domain Key Distributor (DKD), which is the root of the hierarchy. The approach in S. Setia et al., "Kronos: A Scalable Group Re-Keying Approach for Secure Multicast," Proc. Of 2000 IEEE Symposium on Security and Privacy, 2000, has similar requirements. In H. Harney et al., "Group Key Management Protocol (GKMP) Architecture," RFC 2094, July 1997, secure pairwise communication is assumed for the distribution of a group key.

Thus, while many approaches for two-party key negotiation have been extended for use in multi-party key negotiation, they all require generating pairwise keys to establish a secure communication channel for key negotiation traffic. There is a need for a way to negotiate and re-negotiate session keys among multiple parties using an insecure channel. An example of an insecure channel is a public network or group of internetworks, such as the global packet-switched internetworks known as the Internet.

Diffie-Hellman key exchange is widely used to negotiate keys among two parties over an insecure channel, as described in W. Diffie et al., "New Directions in Cryptography," IEEE Transactions on Information Theory, pp. 644–654, November 1976. However, Diffie-Hellman key exchange is difficult to implement in a distributed environment that includes a large group of participants. It requires a node to send a control message to traverse all participants in older to accumulate local random numbers in the exponent of its calculation. When the control message arrives back, the node can compute the shared key. If all nodes follow the same approach, all will have the same key, and the control messages can be sent in the clear.

Unfortunately, the processing overhead involved in this approach, based on the number of messages that must be dispatched to arrive at a shared key, is very high. One known implementation has a complexity of $O(|M|^2)$ with respect to computation or communication, where $|M|$ is the size of the communication group M; this is far higher than the complexity $O(|M|)$ of the established protocols described above.

Based on the foregoing, there is a clear need to negotiate and re-negotiate session keys over a non-secure channel among a large number of multicast group participants in a way that is computationally efficient.

SUMMARY OF THE INVENTION

The foregoing needs, and other needs and objects that will become apparent for the following description, are achieved in the present invention, which comprises, in one aspect, a method and apparatus for negotiating a shared secret among members of a multicast group using a distributed recursion approach.

In one aspect, members of the multicast group are represented by a balanced binary tree. Nodes of the tree are traversed in post-order fashion. As each node is visited, a partial key value is computed and accumulated in the exponent portion of the classical Diffie-Hellman key computation approach. If a particular node has a left or right child sub-tree, each sub-tree is also traversed in post-order fashion by recursively calling methods or subroutines that carry out the traversal and partial key value computation. When traversal of the entire tree is complete, all nodes have the shared secret key. The disclosed approach requires far fewer messages than the approach that requires every node to send a control message to traverse all other nodes.

In one aspect, the invention provides a method of generating a shared secret usable by a plurality of members of a secure multicast communication session. A tree that represents members of the group is created and stored. Each node of the tree representation is associated with a group member. The shared secret is generated by traversing the tree in post-order, and at each node of the tree, recursively generating a partial key value for use in the shared secret and a base value for use in subsequent recursive generations.

According to one feature of this aspect, information is received identifying a number of members in the multicast group, and the tree is created and stored as a balanced binary tree having a root node and a plurality of other nodes equal in number to the number of members of the multicast group.

In another feature, generating the shared secret involves receiving a request to generate a portion of the shared secret at a specified node of the tree, and recursively requesting each sub-tree of the specified node to generate other portions of the shared secret for such sub-trees.

According to another feature, generating the shared secret comprises receiving a request to generate the partial key value at a specified node of the tree; recursively requesting each sub-tree of the specified node to generate other portions of the shared secret for such sub-trees; computing the partial key value based on the other portions of the shared secret of the sub-trees; and sending the partial key value from the specified node to its parent node.

The step of generating the shared secret also may involve receiving a request to generate the partial key value at a specified node of the tree; recursively requesting each sub-tree of the specified node to generate other portions of the shared secret for such sub-trees; computing and storing the partial key value based on the other portions of the shared secret of the sub-trees; computing and storing a new base value for use in subsequent computations of partial key values; and sending the partial key value and the new base value from the specified node to its parent node.

Another feature provides for storing, in association with each node of the tree, values identifying a left child of such node in the tree, a right child of such node in the tree, a parent node of such node in the tree, a next node after such node in a post-order traversal of the tree, and the first node in a post-order traversal of a subtree rooted at such node.

In still another feature, one member in the group is designated as a control member, and the control member carries out the creating and storing step. This may involve, at the control member, storing, in association with each node of the tree, values identifying a left child of such node in the tree, a right child of such node in the tree, a parent node of such node in the tree, a next node after such node in a post-order traversal of the tree, and the first node in a post-order traversal of a subtree rooted at such node.

In another feature, the step of generating the shared secret comprises the steps of sending a key computation message from a root node of the tree to a first node of a subtree rooted at the root node, wherein the key computation message includes a base value and a prime number value.

In still another feature, the step of generating the shared secret further comprises responding to the key computation message. This feature may involve traversing the subtree using post-order traversal until the root node is reached; as each node of the subtree is visited in the traversal, requesting each node and sub-subtree of the subtree to generate portions of the shared secret for such nodes and sub-subtrees; and computing the shared secret at the root node.

In a related feature, the step of generating the shared secret comprises computing a new left subtree base value and a new right subtree base value; sending the new left subtree base value and the prime number value to a left child node of the root node; sending the new right subtree base value and the prime number value to a right child node of the root node.

In yet another related feature, the method provides for recursively performing the steps of traversing, requesting and computing at each node of a first subtree that is rooted at the left child node and at each node of a second subtree that is rooted at the right child node.

Sending the key computation message may include sending a key computation message that comprises an identifier of the node that is sending the key computation message, a base value, and a prime number value.

In another feature, computing a new left subtree base value and a new right subtree base value is performed in response to receiving a base computation message that comprises a base value and a prime number value. The sending steps may include sending a base reply message that includes the base value. The step of recursively performing may include the steps of sending an initialization message that includes a partial shared secret value and the prime number value.

In yet another feature, a flag value is set that indicates whether the key computation message has been generated as a result of receiving a base computation message or receiving an initialization message. Upon returning to the root node of a subtree after post-order traversal of such subtree, the process determines whether the flag value is null, and when the flag value is not null, sends the base value to a further node as identified in the flag value.

Initiating generation of the shared secret may involve sending the initialization message to the root node of the tree. Further, the process may include determining that all nodes of the tree have the shared secret when no message is in transit among any of the nodes. In addition, nodes may explicitly announce completion of key generation by sending confirmation messages, such that the control node may detect that a node is unavailable by failure to receive the confirmation messages. Processing for nodes that join or leave a multicast group is provided.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
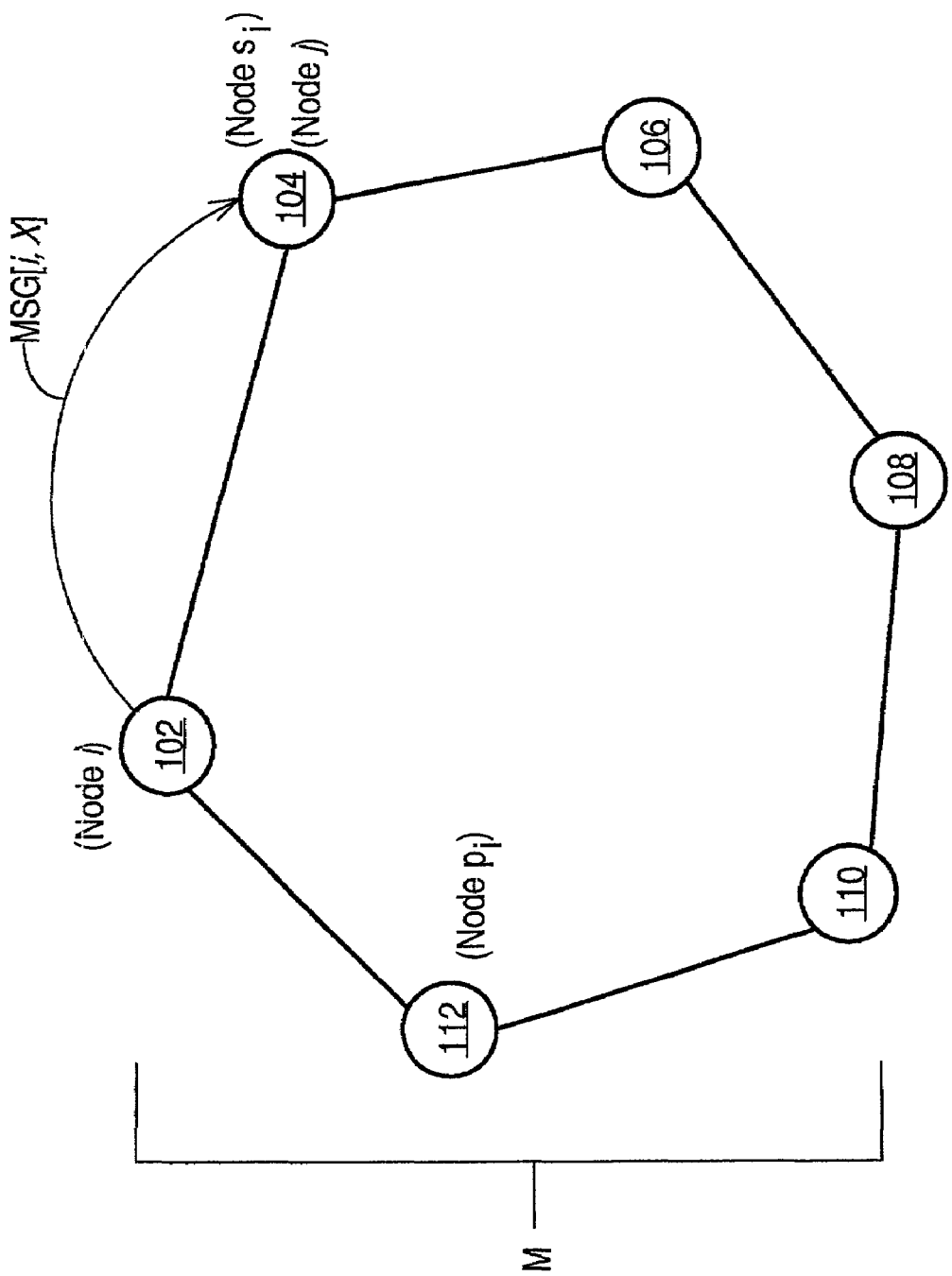
FIG. 1 is a diagram of a multicast group.

A method and apparatus for negotiating a shared secret among members of a multicast group using a distributed recursion approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

1.0 FOUNDATION CONCEPTS
   1.1 DIFFIE-HELLMAN KEY EXCHANGE
   1.2 USING DIFFIE-HELLMAN IN A MULTI-PARTY CONTEXT
2.0 FUNCTIONAL AND STRUCTURAL OVERVIEW OF DISTRIBUTED RECURSION APPROACH FOR USING DIFFIE-HELLMAN IN A MULTI-PARTY CONTEXT
   2.1 GENERAL APPROACH
   2.2 DISTRIBUTED RECURSION APPROACH USING BALANCED LOGICAL BINARY TREE
   2.3 EXPLICT DETECTION OF TERMINATION OF RECURSION
   2.4 APPROACH FOR NODE FAILURE
   2.5 APPROACH FOR DYNAMIC MULTICAST GROUPS
3.0 HARDWARE OVERVIEW
4.0 EXTENSIONS AND ALTERNATIVES 1.0 Foundation Concepts 1.1 Diffie-Hellman Key Exchange Diffie-Hellman key exchange is a well-established protocol that enables two parties to use a non-secure, un-trusted communication channel to establish a shared secret. Diffie-Hellman is described in numerous sources, including W. Diffie et al., "New Directions in Cryptography"; U.S. Pat. No. 4,200,770; and B. Schneier, "Applied Cryptography" ($2^{nd}$ ed. 1999).

Diffie-Hellman has been adapted for use with a public data network, such as the Internet, as the non-secure communication channel. Using Diffie-Hellman, symmetric ciphers and symmetric message integrity mechanisms can be used in a scalable manner, as described in N. Doraswamy et al., "IPSec: The New Standard for the Internet, Intranets, and Virtual Private Networks" (Upper Saddle River, N.J.: Prentice-Hall, 1999). Diffie-Hellman also is used in the Internet Key Exchange (IKE) standard as a session key negotiation protocol, as described in D. Harkins et al., "The Internet Key Exchange (IKE)," RFC 2409, November 1998.

In this description, familiarity with Diffie-Hellman and its basic Internet applications is assumed. For purposes of describing, in a concise manner, values used in Diffie-Hellman key exchange and its applicability to embodiment described herein, the following notation is used:

1. g and p are integers agreed upon by Alice and Bob, who are parties to a communication, where p is a large prime number, and g is primitive mod p;

2. x is a random large integer selected by Alice (her private key);

3. X is a public key that Alice sends to Bob, where $X=g^x$ mod p;

4. y is a random large integer selected by Bob (his private key);

5. Y is a public key that Bob sends to Alice, where $Y=g^y$ mod p; and 6. key is a shared key that Alice computes as key=$Y^x$ mod p=$g^{xy}$ mod p, and that Bob computes as key=$X^y$ mod p=$g^{xy}$ mod p.

1.2 Using Diffie-Hellman in a Multi-Party Context

In one approach described herein, Diffie-Hellman key exchange is extended to operate with three or more nodes in a distributed network environment. In this context, "key" and "secret" are used interchangeably.

FIG. 1 is a block diagram of a multicast group M of network nodes 102, 104, 106, 108, 110, etc. Group M is the group of network nodes that need to negotiate a shared secret, and m is the number of nodes in M. A network node as used herein refers to any processing element that participates in a network. As examples, and not as limitations, nodes 102, 104, 106, etc., may include end station devices such as personal computers, personal digital assistants, wireless telephones, etc.; network infrastructure elements such as routers, switches, and gateways; management infrastructure elements such as controllers and management stations; and any other group participant.

Referring again to FIG. 1, nodes 102, 104, 106, etc. are arranged in a logical ring structure such that each node i knows a network address of its preceding node $p_i$ and successive node $s_i$. For example, for node 102, the preceding node is node 112 and the successive node is node 104. The ring structure is intended to illustrate how messages are communicated among nodes; however, the ring structure is not intended to illustrate actual or physical direct or indirect network connections. The links in the figure can be considered as logical links.

Every node i generates a local random number $x_i$. To compute the shared key, node i sends out a control message that circles along the ring. In FIG. 1, the control message is denoted MSG[i, X] and comprises two parameter values: i identifies the node that originated the message, and X is a partially-computed key, whose initial value was set to g.

Whenever a node j receives the message MSG[i, X], it updates X to be:

$$X \leftarrow X^{x_j} \bmod p$$

Node j then sends the updated message, MSG[i, X], to the next node $s_j$. These steps are iterated such that the message traverses along the ring and accumulates the local random numbers of the other nodes in the partially-computed key. When traversal of the ring is complete, node i receives the message, MSG[i, X], back from its preceding node $p_i$, and at that point the value X is $$X = \left(g^{\prod_{j \in M, j \neq i} x_j}\right) \bmod p$$

Node i then computes $$\text{key} = X^{x_i} \bmod p = \left(g^{\prod_{j \in M} x_j}\right) \bmod p$$

The key itself and the local random numbers are never transmitted in the network, only the partially-computed key X that includes an accumulation of the local random numbers in the exponent of the computation. The difficulty of retrieving the local random numbers from the partially-computed key is the same as breaking conventional public key encryption.

For the purposes of analyzing overhead, in this description, sending a control message over a logical link is counted as one message. Hence, when the message MSG[i, X] completes one traversal of the ring, there are m messages sent among neighboring nodes. These messages can be used only to compute the shared key for a single node i. For all nodes in M to determine the shared key, every other node j has to initiate a message, MSG[j, g], which also travels to all nodes and accumulates the local random numbers of the nodes in a partially-computed key for j. Therefore, a total of $m^2$ messages are required for all nodes to acquire the key, which is an undesirably high number of messages when M has a large number of members. The total length of the messages is $O(m^2)$.

2.0 Functional and Structural Overview of Distributed Recursion Approach for Using Diffie-Hellman in a Multi-Party Context A distributed recursion approach is now described that may be used to efficiently carry out multi-party Diffie-Hellman key exchange.

2.1 General Approach

The approach described herein is applicable to problems that are more general than multi-party Diffie-Hellman key negotiation. In particular, given a group M of nodes in a network, the problem $\Omega_M(M, g, p)$ is to distribute a shared key $$K = \left(g^{\prod_{j \in M} x_j}\right) \bmod p$$

to every node in M', where M' is a subset of M and $x_j$ is the local random number at node j $\forall j \in M$. However, neither K nor $x_j$ may be transmitted over the network.

K is difficult to compute because of the exponential nature of the key calculation. Specifically, the problem is made difficult because the exponent is the production of $x_j$, j∈M, and not the summation of $x_j$, j∈M. Neither K nor $x_j$, j∈M, is allowed to be transmitted from one node to another. Hence, for any node i to calculate K, a control message must traverse all other nodes and arrive back at node i before the key can be calculated. This is the only way to collect every local value $x_j$, j∈M, into the exponent.

The foregoing problem has two special cases. A first special case occurs when the subset M' contains a single node. Suppose M'={i}. The problem may be denoted as $\Omega_i(M, g, p)$, and such problem involves computing K for a single node i. This may be carried out by sending a control message to circle along every node j in M and accumulate $x_j$ in the exponent of the equation set forth above.

A second special case occurs when M'=M. In this case, the problem is $\Omega_M(M, g, p)$, i.e., to compute K for every node in M. This is the multi-party Diffie-Hellman problem for which a solution is presented herein.

2.2 Distributed Recursion Approach Using Balanced Logical Binary Tree

In the approach described herein, an efficient, distributed method to solve $\Omega_M(M, g, p)$ is presented. In general, a distributed divide-and-conquer approach is used. A logical binary tree structure represents the nodes in M. In a first approach, the set of nodes M is assumed to be static, and one designated control node is assumed to have information about all other nodes in M. The designated control node can create a balanced tree structure among the nodes in M, and can send a message to every node i in M, informing such node i about which other nodes are its left child node and right child node. As a result, the tree representation is said to be embedded in M.

A second approach is also applicable to dynamic multicast groups in which members join and leave during a multicast session, as described further below.

Figure 2:
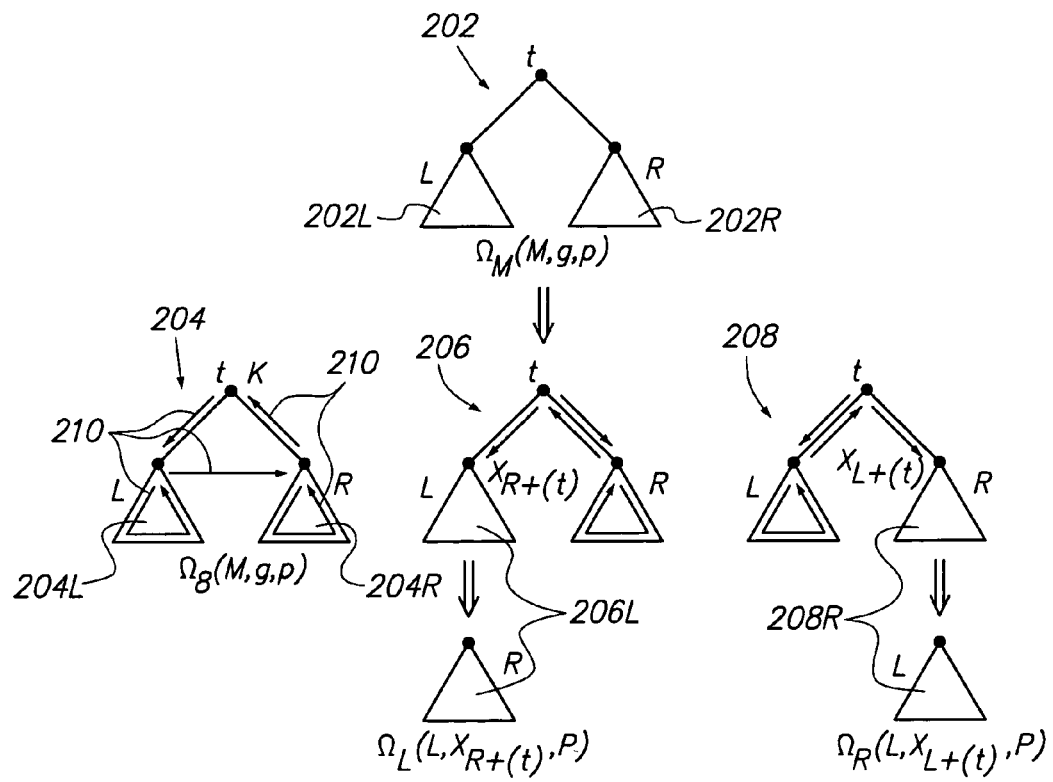
FIG. 2 is a diagram of representative trees illustrating use in a distributed recursion approach.

FIG. 2 is a diagram of a tree structure and how it is used in a distributed recursion approach. In FIG. 2 and in this description, references to the tree structure use the following notation:

t is the root of the tree.
L is a left subtree of a particular node.
R is a right subtree of a particular node.

Accordingly, {t}+L+R=M. Thus, in FIG. 2, tree 202 has a root node t, a left subtree 202L (also designated L), and a right subtree 202R (also designated R).

Further, for any node i within M, $T_i$ is the subtree rooted at i,
$l_i$ is the subtree rooted at the left child of i, and
$r_i$ is the subtree rooted at the right child of i.

If a particular node i does not have a left child, then $l_i$ is null; if there is no right child, then $r_i$ is null.

Using the foregoing tree representation, the problem may be solved using a distributed recursion process.

Specifically, the original problem $\Omega_M(M, g, p)$ is divided into three sub-problems that involve computing a partial key for the root node, left sub-tree, and right sub-tree, respectively. The three sub-problems are respectively denoted $\Omega_t(M, g, p)$, $\Omega_L(M, g, p)$, and $\Omega_R(M, g, p)$. In FIG. 2, the original problem is represented by tree 202 and the three sub-problems are represented by trees 204, 206, 208, respectively.

The first sub-problem, $\Omega_t(M, g, p)$, is to compute K for t. The second sub-problem, $\Omega_L(M, g, p)$, is to compute K for every node in the left sub-tree L, and the third sub-problem $\Omega_R$ (M, g, p) is to compute K for every node in the right sub-tree R.

The first sub-problem $\Omega_t$(M, g, p) is solved by causing node t to send a control message to traverse all nodes in the tree, as indicated by arrows 210 in FIG. 2. This takes O(|M|) in computational complexity.

The second sub-problem and third sub-problem are solved by sending a control message to traverse only nodes in the left sub-tree and right sub-tree, respectively, using recursive processing. In one specific embodiment, recursive software subroutine calls or method invocations may be used. For the purpose of facilitating such recursion, the second sub-problem $\Omega_L$(M, g, p), is transformed to an equivalent problem $\Omega_L$(L, $X_{R+\{t\}}$, p), as indicated by subtree 206L of FIG. 2, and wherein $$X_{R+\{t\}} = \left(g^{\prod_{j \in R+\{t\}} x_j}\right) \bmod p$$

By applying the general problem definition given in section 2.1 hereof, it may be seen that problem $\Omega_L$(L, $X_{R+\{t\}}$, p) is to calculate the following secret for every node in L:

$$K' = (X_{R+\{t\}})^{\prod_{j \in L} x_j} \bmod p$$

Applying substitution, the key computation becomes:

$$K' = \left(g^{\prod_{j \in R+\{t\}} x_j}\right)^{\prod_{j \in L} x_j} \bmod p = g^{\prod_{j \in M} x_j} \bmod p = K$$

Therefore, problem $\Omega_L$(L, $X_{R+\{t\}}$, p) is to calculate K for every node in L, which is equivalent to the original problem $\Omega_M$(M, g, p). It takes O(|R|) messages to traverse the right sub-tree to compute $X_{R+\{t\}}$.

Similarly, the third sub-problem $\Omega_R$(M, g, p) is equivalent to $\Omega_R$(R, $X_{L+\{t\}}$, p), where $$X_{L+\{t\}} = \left(g^{\prod_{j \in L+\{t\}} x_j}\right) \bmod p$$

It takes O(|L|) messages to traverse the left sub-tree to compute $X_{L+\{t\}}$. Therefore, it takes O(M+R+L)=O(M) messages to reduce the original problem $\Omega_M$(M, g, p) to two identical sub-problems, $\Omega_L$(L, $X_{R+\{t\}}$, p) and [[•]]$\Omega_R$(R, $X_{L+\{t\}}$, p).

Because this approach is applied in the context of a distributed network system, a message-driven approach to recursively solving the sub-problems is desired. A message-driven approach may be supported by certain particular data structures. In one embodiment, each node of the trees of FIG. 2, stores the following values:

$l_i$, the left child of i in the logical tree;
$r_i$, the right child of i in the logical tree;
$p_i$, the parent node of i in the logical tree;
$s_i$, the next node of i in the post-order traversal of the tree, called the "successor" of i;
$f_i$, the first node in the post-order traversal of $T_i$, which is the subtree rooted at i.

The designated control node stores information about all nodes in M. The control node constructs the logical tree in memory, computes the foregoing values, and sends the computed values to each node i. Any node may be designated as or serve as the control node.

Figure 3:
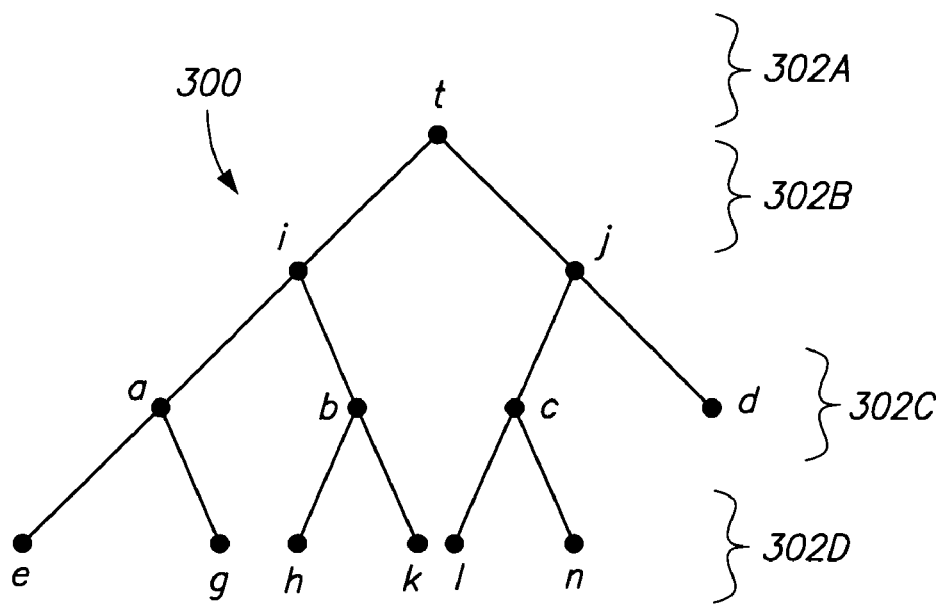
FIG. 3 is a diagram of a balanced binary tree.

FIG. 3 is a diagram illustrating an example tree. In the example of FIG. 3, tree 300 is constructed as a binary complete tree. Except for the last level, every other level 302A, 302B, 302C of the tree is fully filled with nodes; the last level 302D may be either partially filled from left to right, as in FIG. 3, or fully filled.

Tree 300 is traversed in post-order fashion. Post-order tree traversal first traverses the left subtree, then the right subtree, and finally the root. For example, in FIG. 3, from node i, the next node in post-order traversal is node l. Hence, $s_i$=l. In the subtree that is rooted at i, the first node in the post-order traversal is e. Therefore, $f_i$=e. A complete post-order traversal of tree 300 would visit all nodes in the following order:

e, g, a, h, k, b, i, l, n, c, d, j, t.

In this arrangement, because every node knows its successor node, any node may easily carry out a post-order traversal of its subtree. Referring again to FIG. 3, assume that post-order traversal of the subtree rooted at i is required. The node i sends a message to node $f_i$, which is node e. Starting from $f_i$, the message follows the successor link, and goes to nodes g, a, h, k, b, and i. When the message arrives back at node i, the node i knows that the message has completed a post-order traversal of $T_i$.

Figure 4A:
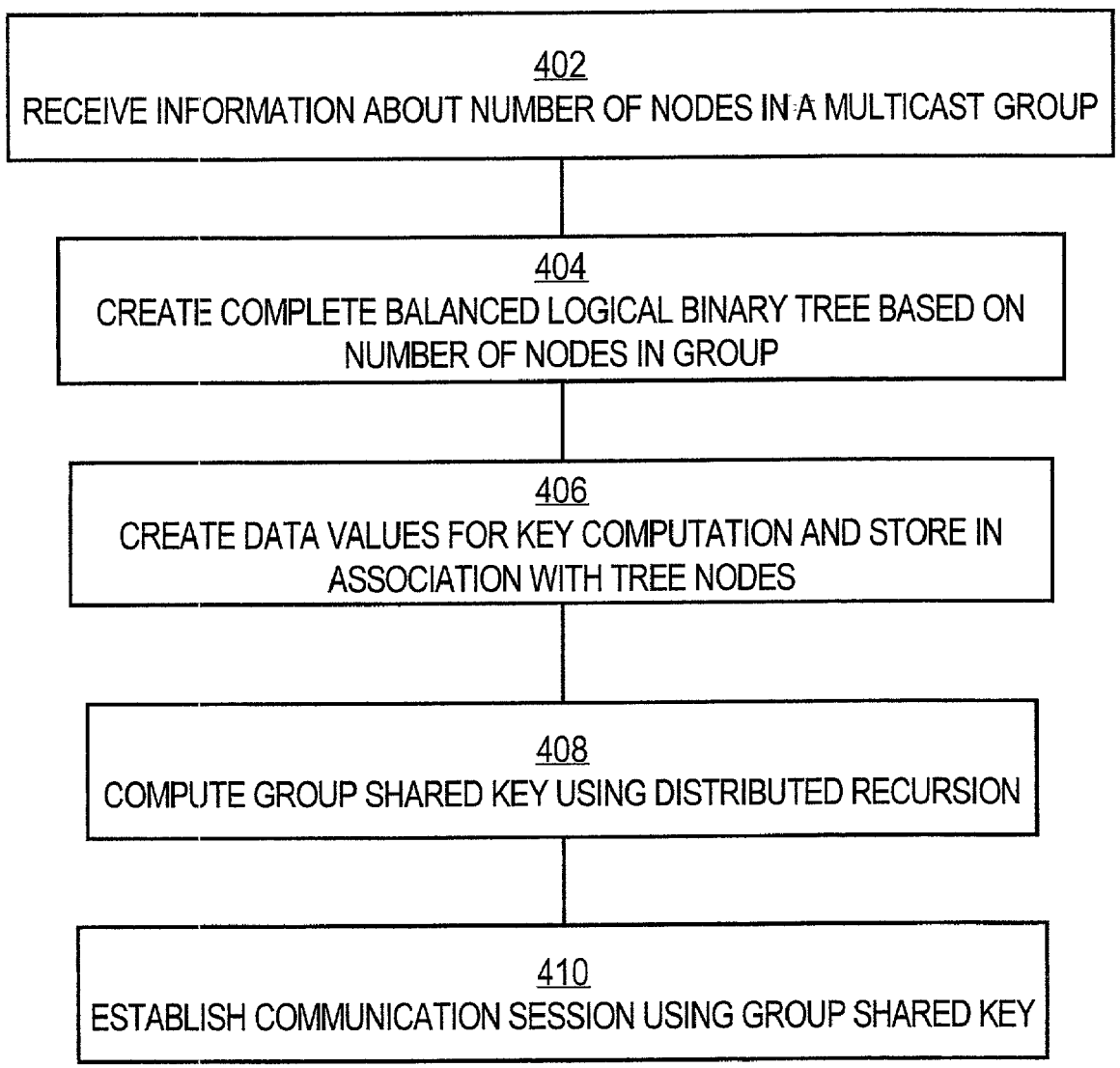
FIG. 4A is a flow diagram of one embodiment of a distributed recursion process for determining a multi-party session key.

FIG. 4A is a flow diagram of one embodiment of a distributed recursion process for determining a multi-party session key. In one embodiment, the process of FIG. 4A is implemented in the form of computer program instructions. The instructions may be executed by a network node, such as a multicast router or switch.

In block 402, information about the number of nodes in a multicast group is received. For example, block 402 represents receiving, at a process responsible for computing multicast group shared session keys, a value identifying the number of nodes in a multicast group. Alternatively, block 402 represents the process receiving a signal that a node has joined or left such that the number of nodes in the group has changed.

In block 404, a complete balanced logical binary tree is created, based on the number of nodes in the group. For example, if the number of nodes received in block 402 is 32, then block 404 involves creating a tree in computer memory that has 32 nodes and in which each level of the tree is filled, except possibly for the last level.

In block 406, data values for key computation are created and stored in association with the tree nodes. In one specific embodiment, one node is designated as a control node and stores information about all nodes in the tree. The control node computes the values identified above, and sends the computed values to each node. In this context, "send" means to store the computed values in each node of the tree representation that is stored in memory by the control node, and sending the computed values in network messages to all other network devices that are participating as members of the multicast group.

In block 408, a group shared key is computed using a distributed recursion approach.

In block 410, a communication session is established among all nodes of the multicast group using the group shared key.

Figure 5A:
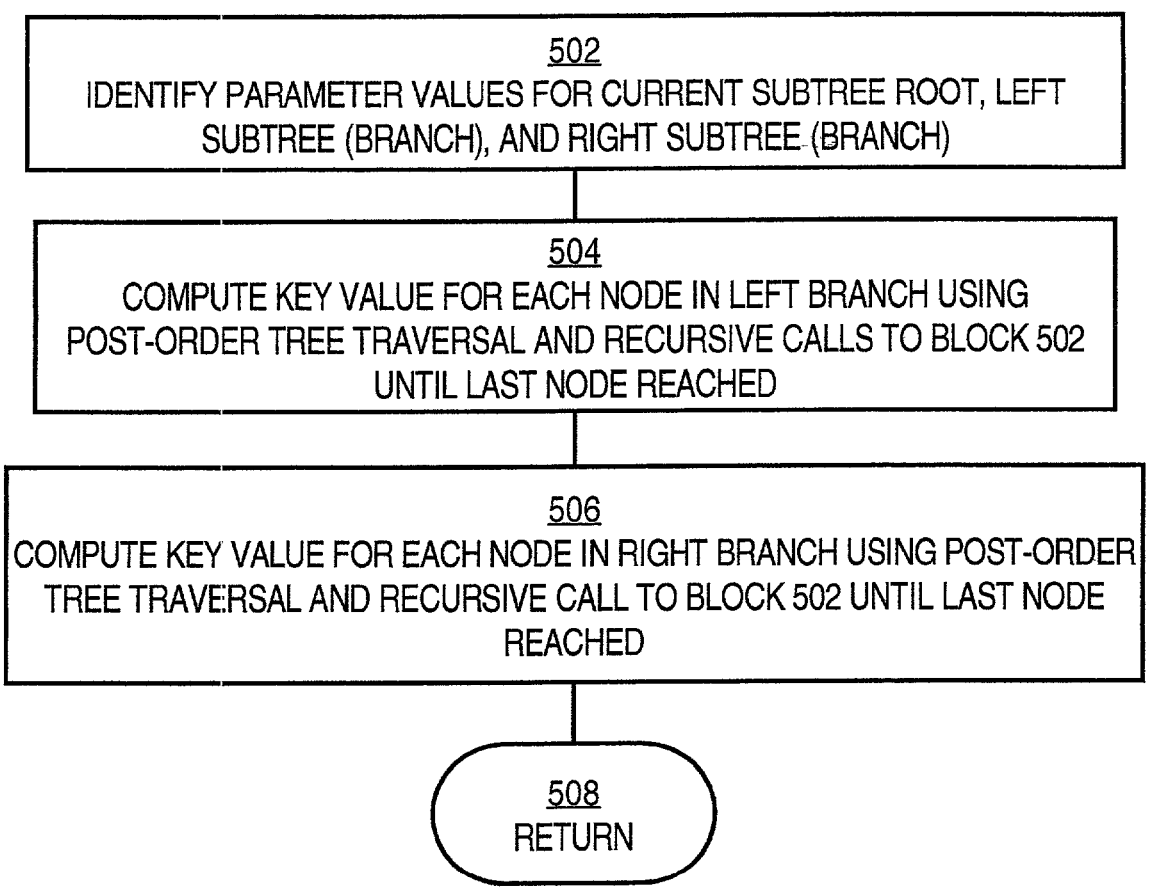
FIG. 5A is a flow diagram that presents a high level overview of computation of a group shared key.

FIG. 5A is a flow diagram that presents a high level overview of computation of a group shared key.

The distributed recursive computation starts from the root node t. In block 502, parameter values are identified for the current subtree root node, left subtree, and right subtree. In block 504, a key value is computed for each node in the left subtree, using post-order tree traversal and recursive calls to block 502, until the last node of the left subtree is reached. In block 506, a key value is computed for each node in the right subtree, using post-order tree traversal and recursive calls to block 502, until the last node of the right subtree is reached. When the tree has been traversed in this manner, in block 508 the computation of the distributed group shared key is completed.

Figure 5B:
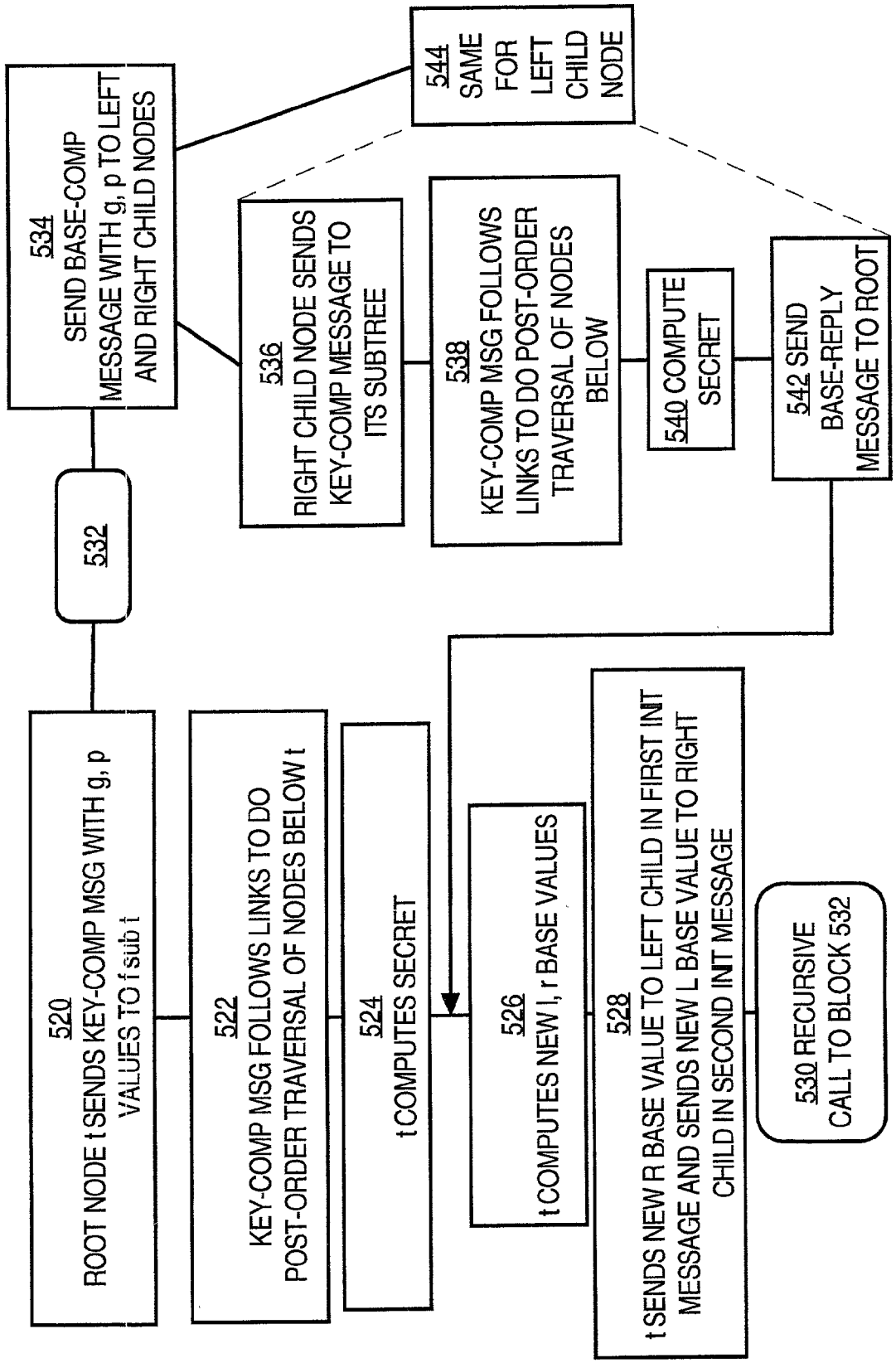
FIG. 5B is a flow diagram providing a more detailed view of the process of FIG. 5A.

FIG. 5B is a flow diagram providing a more detailed view of the process of FIG. 5A.

In one embodiment, the root node selects a random base value g and prime number value p for use in key computation. The root sends out three control messages, consisting of one key computation ("KEY-COMP") message and two base computation ("BASE-COMP") messages. All messages carry the initial base value g and the prime number value p for use in conventional Diffie-Hellman key computation.

The KEY-COMP message is sent to the node $f_t$, as shown by block 520. The message is forwarded along node links to successor nodes in post-order traversal of the tree, collecting the accumulated value $x_j$, j∈M, for use in the exponent of the key computation, as shown in block 522. In one embodiment, when the KEY-COMP message finishes traversing both subtrees L and R, and returns to t, it carries the following value:

$$X_{L+R} = \left(g \prod_{j \in L+R} x_j\right) \bmod p$$

As a result, as indicated in block 524, node t can compute secret value. In one embodiment, the secret value is computed as:

$$X_M = (X_{L+R})^{x_t} \bmod p = g \prod_{j \in M} x_j \bmod p = K$$

As indicated by block 534 and block 544, the two BASE-COMP messages are sent to the two child nodes of t to compute $X_{R+\{t\}}$ and $X_{L+\{t\}}$. In one embodiment, such computations are carried out as described herein with reference to FIG. 2.

Figure 4B:
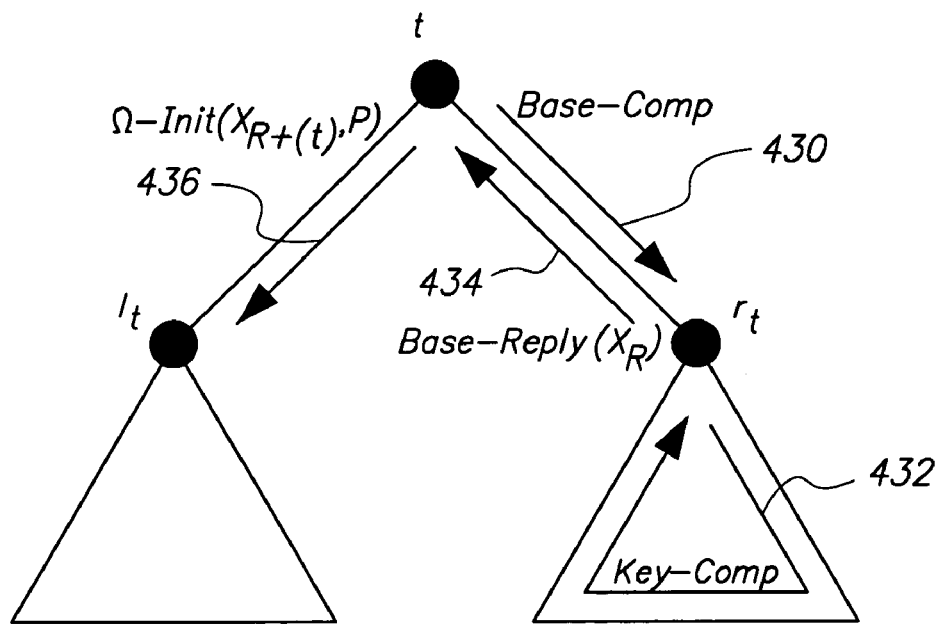
FIG. 4B is a diagram of messages that are communicated by nodes of an example tree in response to receiving a BASE-COMP message, in one embodiment.

FIG. 4B is a diagram of messages that are communicated by nodes of an example tree in response to receiving a BASE-COMP message, in one embodiment. When the right child node $r_t$ receives a BASE-COMP message 430, it issues a KEY-COMP message 432 to traverse its subtree, in the manner described above, and as shown by block 536 and block 538 of FIG. 5B. As a result, it computes the value $$X_R = g \prod_{j \in R} x_j \bmod p$$

as indicated by block 540. It then sends the value $X_R$ in a base value reply ("BASE-REPLY") message 434 to node t, as shown by block 542. Once t receives the value, it can compute the new base value $$X_{R+\{t\}} = (X_R)^{x_t} \bmod p = g \prod_{j \in R+\{t\}} x_j \bmod p$$

as indicated by block 526. Similarly, the BASE-COMP message that is sent from root node t to left child node $l_t$ will result in computing $X_{L+\{t\}}$.

The values resulting from the foregoing traversal, $X_{R+\{t\}}$ and $X_{L+\{t\}}$, are the base values of the two sub-problems described above. Therefore, node t sends the new R base value to the left child in a first initiate-computation ("INIT") message 436, and sends the new L base value to the right child in a second INIT message, as stated in block 528. In one specific embodiment, in order to solve the first sub-problem, $\Omega_L(M, g, p)$, root node t sends the value $X_{R+\{t\}}$ to $l_t$ using an $\Omega$-INIT message, as shown by message 430 in FIG. 4B.

As shown by block 530, a recursive call is made to block 532 and the message invokes the recursive computation at $l_t$, which repeats what t does with an initial base value of $X_{R+\{t\}}$ instead of g. In the recursive computation, $l_t$ sends a KEY-COMP message to traverse its subtree. Once it receives the KEY-COMP message back, it can compute the secret K for itself. It also sends two BASE-COMP messages to compute the new base values for the two sub-problems associated with its child nodes. Once BASE-REPLY messages are received, node $l_t$ can send $\Omega$-INIT messages to its children to recursively compute the secret K for every node in L.

In similar fashion, root node t sends node $r_t$ an $\Omega$-INIT message with the value $X_{L+\{t\}}$ to recursively compute the secret K for every node in R.

In one specific embodiment, the KEY-COMP message carries three parameter values designated v, X, p. The value v identifies the node that initiates the message, X is the base value for the subsequent key computation, and g is the prime number value. When a node i receives the KEY-COMP message, it computes the value Y=X$^{x_i}$ mod p If i≠v, i sends the message KEY-COMP(v,Y,p) to the next node in the post-order traversal.

Also in a specific embodiment, the BASE-COMP message carries two parameters designated X, p. The value X is the base value for the subsequent computation and p is the prime number. When a node i receives this message from its parent node $p_i$, i uses a message KEY-COMP(i,X,p) to compute the value $$Y = X \prod_{j \in T_i} x_j \bmod p$$

Node i then sends the message BASE-REPLY(Y) back to $p_i$.

In this specific embodiment, the message BASE-REPLY (X) is defined as follows. When a node i receives this message from its left child, i computes the value Y=X$^{x_i}$ mod p The node i then sends the message $\Omega$-INIT(Y,p) to its right child to activate the computation for the sub-problem corresponding to its right subtree. The same process is followed when a message is received from the right child, except that the $\Omega$-INIT message is sent to the left child.

Also in this specific embodiment, the message $\Omega$-INIT(X, p) is defined as follows. When a node i receives this message, it activates the computation for the problem $\Omega_{T_i}(T_i, X, p)$. Node i sends the message KEY-COMP(i,X,p) to compute K for itself, and sends BASE-COMP(X,p) messages to compute the base values for its sub problems.

In these embodiments, KEY-COMP messages travel along the post-order links; BASE-COMP and $\Omega$-INIT messages travel from parent nodes to child nodes; BASE-REPLY messages travel from child nodes to parent nodes.

A KEY-COMP message can be created as the result of a node i receiving either a BASE-COMP message or an $\Omega$-INIT message. In either case, the KEY-COMP message causes the same response; it traverses a subtree in post order. However, when node i receives the KEY-COMP message after traversal is complete, node i takes different subsequent actions depending on whether the KEY-COMP message followed a BASE-COMP message or an $\Omega$-INIT message.

Specifically, if the KEY-COMP message initiated as a result of receiving a BASE-COMP message from $p_i$, i sends a BASE-REPLY message back to $p_i$. However, if the KEY-COMP message initiated as a result of receiving an $\Omega$-INIT message from $p_i$, i does not send back a BASE-REPLY message. To distinguish these cases, i stores a variable $\beta$ having an initial value of NULL. When i receives a BASE-COMP message from $p_i$, i sets $\beta$ to be $p_i$ before sending out KEY-COMP. When i receives the KEY-COMP message back, if $\beta \neq$ NULL, then i needs to send back a BASE-REPLY message to the node indicated by $\beta$.

Table 1 presents pseudo-code of an implementation of the foregoing approaches. In particular, Table 1 presents pseudo-code that describes the actions that i takes in response to receiving a message from a node k. The algorithm represented by the code of Table 1 is executed at every node in M. The collective behavior of all such nodes implements the distributed recursive computation that solves the general problem $\Omega_M(M, g, p)$.

TABLE 1

PSEUDO-CODE FOR NODE PROCESSING switch (the received message)
case KEY-COMP (v, X, p)
    Y:=$X^{xi}$ mod p
    if (i = v)
        if ($\beta$=NULL)
            i keeps Y as the shared secret
        else
            /* The received KEY-COMP was originally initiated by a */
            /* BASE-COMP message from $\beta$. */
            /* Therefore $\beta$ stores the parent node of i. */
            send BASE-REPLY(Y) to $\beta$
            $\beta$:=NULL
    else
        send KEY-COMP(v,Y,p) to $s_i$
case BASE-COMP (X,p)
    if ($f_i \neq$ NULL)
        send KEY-COMP(i,X,p) to $f_i$
        $\beta$:=K
    else
        Y:=$X^{xi}$ mod p
        send BASE-REPLY(Y) to k
case BASE-REPLY(X)
    Y:=$X^{xi}$ mod p
    if (k=$l_i$)
        send $\Omega$-INIT(Y,p) to $r_i$
    else
        send $\Omega$-INIT(Y,p) to $l_i$ TABLE 1-continued

PSEUDO-CODE FOR NODE PROCESSING case $\Omega$-INIT(X,p)
    if ($f_i$=NULL)
        Y:=$X^{xi}$ mod p
        i keeps Y as the secret
    else
        send KEY-COMP(i,X,p) to $f_i$
        if ($l_i \neq$ NULL and $r_i$=NULL)
            Y:=$X^{xi}$ mod p
            send $\Omega$-INIT(Y,p) to $l_i$
        if ($l_i \neq$ NULL and $r_i \neq$ NULL)
            send BASE-COMP (X,p) to $l_i$
            send BASE-COMP (X,p) to $r_i$ In this arrangement, the distributed recursion computation approach may be started by causing the root node of the tree to send the message $\Omega$-INIT(g,p) to itself. The distributed recursion completes when there is no control message transmitting in the network. Upon such completion, every node in M has the shared secret K.

Thus, a novel distributed approach based on distributed recursion has been described. The approach implements multi-party Diffie-Hellman key exchange with a complexity in terms of computation load or number of messages of only $O(|M| \log |M|)$ where $|M|$ is the size of the communication group M. The approach differs from centralized recursion in that no node in the system has the complete information needed to compute a key. The approach is message-driven, and recursively reduces large-scale distributed computation problems into similar problems that have smaller sizes. The approach is efficient, concise and easy to implement.

2.3 Explict Detection of Termination of Recursion

An alternative approach provides explicit detection of the termination of the distributed recursion. For example, a child node may use CONFIRM messages to inform a parent node of the completion of computations for a sub problem. Such a message is analogous to a programmatic "return" occurring in child procedure calls that are issued as part of the recursive approach. Thus, after a child node that is a leaf node computes the shared secret, it sends a CONFIRM message to its parent. When a non-leaf node computes the shared secret and receives a CONFIRM message from each child node, the non-leaf node sends a CONFIRM message to its parent. When the root node computes the shared secret and receives a CONFIRM message from each child node, the distributed recursion is complete and all nodes have the shared secret.

2.4 Approach for Node Failure

If any node in M fails, the key negotiation process is blocked. Such failure can be detected at the root, by failure of the root to receive the CONFIRM messages. The root may time out and signal the designated control node that a node in M may have failed. The control node then polls all nodes in M to check the status of each node and remove any failed node from M. The control node then constructs a new logical tree in memory that represents the new set of nodes, and signal the root node to initiate key negotiation.

2.5 Approach for Dynamic Multicast Groups

Key negotiation for dynamic multicast groups may be carried out in a similar manner. When a node leaves a group, it signals the control node of its departure. The designated node constructs a new logical tree without this node. When a node joins a group, it also signals the control node to add itself to the logical tree. For highly dynamic multicast groups, the approaches herein may utilize existing multicast trees of current multicast protocols, rather than the logical trees described herein.

3.0 Hardware Overview

Figure 6:
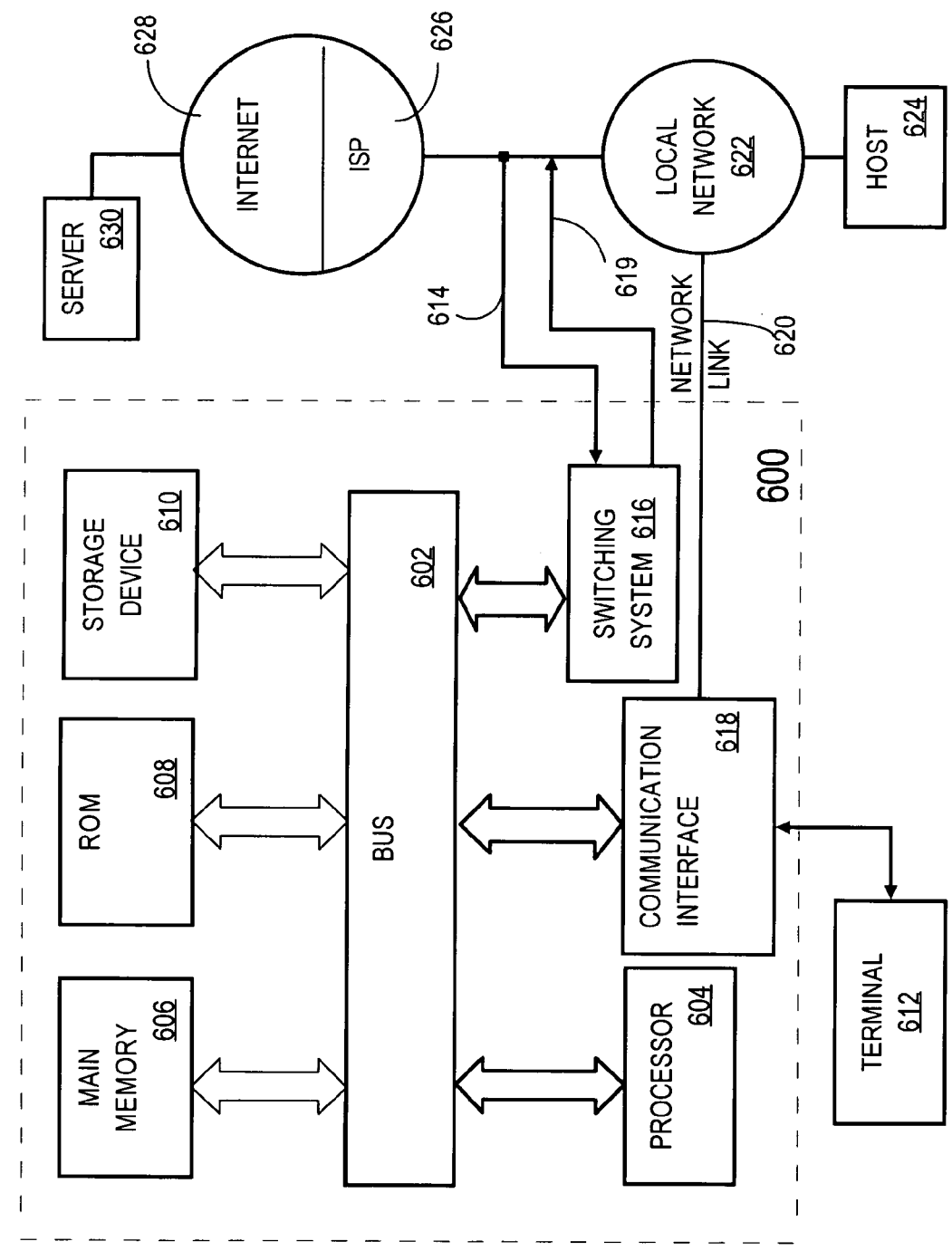
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Network 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Network 628.

The invention is related to the use of computer system 600 for negotiating a shared secret among members of a multicast group using a distributed recursion approach. According to one embodiment of the invention, negotiating a shared secret among members of a multicast group using a distributed recursion approach is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is communicatively coupled to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Network Service Provider (ISP) 626. ISP 626 in turn provides data communication services through the world wide packet data communication network now commonly referred to as the "Internet" 628. Local network 622 and Network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Network example, a server 630 might transmit a requested code for an application program through Network 628, ISP 626, local network 622 and communication interface 618. In accordance with the invention, one such downloaded application provides for negotiating a shared secret among members of a multicast group using a distributed recursion approach as described herein.

The received code may be executed by processor 604 as it is received, and/or stored in storage device 610, or other non-volatile storage for later execution. In this manner, computer system 600 may obtain application code in the form of a carrier wave.

4.0 Extensions and Alternatives

By interoperating with security and access control mechanisms of SNMPv3, and providing modifications to the SNMP Agent and instrumentation that are reasonable in scope, the disclosed approaches provide simplicity and scalability.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of generating a shared secret for a plurality of members of a multicast group to use in a secure communication session, the method comprising the computer-implemented steps of:
   creating and storing a tree that represents the group, wherein each node of the tree is associated with a group member; and
   generating the shared secret by traversing the tree in post-order, and at each node of the tree, recursively generating a partial key value for use in the shared secret and a base value for use in subsequent recursive partial key value generation;
   wherein the base value is accumulated and computed by performing at least one exponential operation with an exponent that is a local random number that is associated with a specific node of a specific subtree that is rooted at that node of the tree.

2. A method as recited in claim 1, further comprising the steps of:
   receiving information identifying a number of members of the multicast group;
   creating and storing the tree as a balanced binary tree having a root node and a plurality of other nodes equal in number to the number of members of the multicast group.

3. A method as recited in claim 1, wherein the step of generating the shared secret comprises the steps of:
   receiving a request to generate a portion of the shared secret at a particular node of the tree;
   recursively requesting each sub-tree of the particular node to generate other portions of the shared secret for such sub-trees.

4. A method as recited in claim 1, wherein the step of generating the shared secret comprises the steps of:
   receiving a request to generate the partial key value at a particular node of the tree;
   recursively requesting each sub-tree of the particular node to generate other portions of the shared secret for such sub-trees;
   computing the partial key value based on the other portions of the shared secret of the sub-trees.

5. The method as recited in claim 1, wherein the step of generating the shared secret comprises the steps of:
   receiving a request to generate the partial key value at a particular node of the tree;
   recursively requesting each sub-tree of the particular node to generate other portions of the shared secret for such sub-trees;
   computing and storing the partial key value based on the other portions of the shared secret of the sub-trees;
   computing and storing a new base value for use in subsequent computations of partial key values; and
   sending the partial key value and the new base value from the particular node to its parent node.

6. The method as recited in claim 1, further comprising the steps of:
   storing, in association with each node of the tree, values identifying a left child of such node in the tree, a right child of such node in the tree, a parent node of such node in the tree, a next node after such node in a post-order traversal of the tree, and the first node in a post-order traversal of a subtree rooted at such node; and
   using the values to guide post-order traversal of the tree.

7. The method as recited in claim 1, further comprising the steps of:
   designating one member in the group as a control member;
   wherein the control member carries out the creating and storing step; and
   at the control member, storing, in association with each node of the tree, values identifying a left child of such node in the tree, a right child of such node in the tree, a parent node of such node in the tree, a next node after such node in a post-order traversal of the tree, and the first node in a post-order traversal of a subtree rooted at such node.

8. A method as recited in claim 1, further comprising the steps of automatically establishing a secure multicast session among the group members using the shared secret.

9. A method as recited in claim 1, wherein the step of generating the shared secret comprises the steps of sending an initialization message from a root node of the tree to a first node of a first subtree rooted at the first node, wherein the initialization message includes a base value and a prime number value.

10. A method as recited in claim 9, wherein the step of generating the shared secret further comprises the steps of responding to the initialization message by performing the steps of:
    sending a key computation message to traverse the first subtree using post-order traversal until the first node is reached;
    as each node of the subtree is visited in the traversal, requesting each node to generate a partial shared secret;
    computing the shared secret at the first node.

11. A method as recited in claim 10, wherein the step of generating the shared secret comprises the steps of:
  computing a new left subtree base value and a new right subtree base value;
  sending the new left subtree base value and the prime number value to a left child node of the first node;
  sending the new right subtree base value and the prime number value to a right child node of the first node.

12. A method as recited in claim 11, further comprising the steps of recursively performing the steps of traversing, requesting and computing at each node of a left subtree that is rooted at the left child node and at each node of a right subtree that is rooted at the right child node.

13. A method as recited in claim 10, wherein sending the key computation message includes sending a key computation message that comprises an identifier of the node that is sending the key computation message, a base value, and a prime number value.

14. A method as recited in claim 11, wherein the step of computing a new left subtree base value and a new right subtree base value is performed in response to receiving a base computation message that comprises a base value and a prime number value.

15. A method as recited in claim 11, wherein each of the steps of sending includes the step of sending a base reply message that includes the base value.

16. A method as recited in claim 12, wherein the step of recursively performing includes the steps of sending an initialization message that includes a partial shared secret value and the prime number value.

17. A method as recited in claim 16, further comprising the steps of:
  setting a flag value that indicates whether the key computation message has been generated as a result of receiving a base computation message or receiving an initialization message;
  upon returning to the root node of a subtree after post-order traversal of such subtree, determining whether the flag value is null, and when the flag value is not null, sending the base value to a further node as identified in the flag value.

18. A method as recited in claim 16, further comprising the step of initiating generation of the shared secret by sending the initialization message to the root node of the tree.

19. A method as recited in claim 9, further comprising the step of determining that all nodes of the tree have the shared secret when no message is in transit among any of the nodes.

20. A method as recited in claim 1, further comprising the steps of sending a confirmation message from any node that has computed the shared secret to its parent node.

21. A method as recited in claim 1, further comprising the steps of:
  when a child node has computed the shared secret, sending a confirmation message to its parent node;
  when a child node that is a leaf node has computed the shared secret, sending a confirmation message to its parent node;
  when a non-leaf node has computed the shared secret and received a confirmation message from each of its child nodes, sending a confirmation message to its parent node;
  when the root node has computed the shared secret and received a confirmation message from each of its child nodes, determining that all nodes have the shared secret.

22. A method as recited in claim 20, further comprising the steps of:
  determining that a node has failed based upon failure to receive a confirmation message therefrom;
  removing the failed node from the multicast group
  creating and storing a new tree that represents a new set of nodes without the failed node;
  sending an initiation message to a new root node of the new tree to cause the new root node to initiate key generation.

23. A method as recited in claim 22, further comprising the steps of sending a failure warning message from one node to the control node, and in response thereto, polling all nodes in the multicast group to check the status of each node.

24. A method as recited in claim 1, further comprising the steps of:
  sending a departure message from a first node that is leaving the multicast group to the control node;
  in response to receiving the departure message, creating and storing a new tree that represents a new set of nodes without the departed node;
  sending an initiation message to a new root node of the new tree to cause the new root node to initiate key generation.

25. A method as recited in claim 1, further comprising the steps of:
  sending a joining message from a first node that is joining the multicast group to the control node;
  in response to receiving the joining message, creating and storing a new tree that represents a new set of nodes that includes the joining node;
  sending an initiation message to a new root node of the new tree to cause the new root node to initiate key generation.

26. A method of generating a shared secret for a plurality of members of a multicast group to use in a secure communication session, the method comprising the computer-implemented steps of:
  creating and storing a tree that represents the group, wherein each node of the tree is associated with a group member; and
  generating the shared secret by traversing the tree in post-order, and at each node of the tree, recursively generating a partial key value for use in the shared secret and a base value for use in subsequent recursive partial key generation, wherein the base value is accumulated and computed by performing at least one exponential operation with an exponent that is a local random number that is associated with a specific node of a specific subtree that is rooted at that node of the tree, by the steps of:
  selecting an initial base value g and prime number value p;
  sending a key computation message that includes the initial base value g and the prime number value p to a first node of a left subtree L that is rooted at the root node;
  forwarding the key computation message to each successor nodes in post-order traversal of the subtree, collecting an accumulated exponent value $x_j$, $j \in M$;
  repeating the sending step and forwarding step for a right subtree R that is rooted at the root node;
  upon completion of the post-order traversal, receiving at the root node a value $$X_{L+R} = \left(g^{\prod_{j \in L+R} x_j}\right) \bmod p$$

computing the shared secret value as $$X_M = (X_{L+R})^{x_i} \bmod p = g^{\prod_{j \in M} x_j} \bmod p = K;$$

27. A method as recited in claim 26, further comprising the steps of:
   requesting a first child node of the root node and a second child node of the root node to respectively compute a first new base value and a second new base value $X_{R+\{t\}}$ and $X_{L+\{t\}}$;
   for the first child node, recursively issuing a key computation message to traverse its subtree, to result in computing a first base value $$X_R = g^{\prod_{j \in R} x_j} \bmod p;$$

sending the first base value $X_R$ to the root node;
   computing a first new root base value at the root node as $$X_{R+\{t\}} = (X_R)^{x_t} \bmod p = g^{\prod_{j \in R+\{t\}} x_j} \bmod p;$$

performing the steps of requesting, issuing, sending and computing for the second child node, to result in computing a second new root base value $X_{L+\{t\}}$.

28. A method as recited in claim 27, further comprising the steps of:
   sending the first new root base value $X_{R+\{t\}}$ and the second new root base value $X_{L+\{t\}}$ to the left child node and right child node, respectively, of the root node;
   recursively computing subsequent shared secret values and new base values for the left child node using the new root base value of $X_{R+\{t\}}$;
   recursively computing subsequent shared secret values and new base values for the left child node using the new root base value of $X_{L+\{t\}}$.

29. A computer-readable medium carrying one or more sequences of instructions for generating a shared secret for a plurality of members of a multicast group to use in a secure communication session, which instructions, when executed by one or more processors, cause the one or more processors to carry out the steps of:
   creating and storing a tree that represents the group, wherein each node of the tree is associated with a group member; and
   generating the shared secret by traversing the tree in post-order, and at each node of the tree, recursively generating a partial key value for use in the shared secret and a base value for use in subsequent recursive partial key value generation;
   wherein the base value is accumulated and computed by performing at least one exponential operation with an exponent that is a local random number that is associated with a specific node of a specific subtree that is rooted at that node of the tree.

30. An apparatus for generating a shared secret for a plurality of members of a multicast group to use in a secure communication session, comprising:
   means for creating and storing a tree that represents the group, wherein each node of the tree is associated with a group member; and
   means for generating the shared secret by traversing the tree in post-order, and at each node of the tree, recursively generating a partial key value for use in the shared secret and a base value for use in subsequent recursive partial key value generation;
   wherein the base value is accumulated and computed by performing at least one exponential operation with an exponent that is a local random number that is associated with a specific node of a specific subtree that is rooted at that node of the tree.

31. An apparatus for generating a shared secret for a plurality of members of a multicast group to use in a secure communication session, comprising:
   a network interface that is coupled to the data network for receiving one or more packet flows therefrom;
   a processor;
   one or more stored sequences of instructions which, when executed by the processor, cause the processor to carry out the steps of:
      creating and storing a tree that represents the group, wherein each node of the tree is associated with a group member; and
      generating the shared secret by traversing the tree in post-order, and at each node of the tree, recursively generating a partial key value for use in the shared secret and a base value for use in subsequent recursive partial key value generation;
      wherein the base value is accumulated and computed by performing at least one exponential operation with an exponent that is a local random number that is associated with a specific node of a specific subtree that is rooted at that node of the tree.

* * * * *

UNITED STATES PATENT AND TRADEMARK OFFICE
CERTIFICATE OF CORRECTION

| | |
|---|---|
| PATENT NO. | : 7,096,356 B1 |
| APPLICATION NO. | : 09/894721 |
| DATED | : August 22, 2006 |
| INVENTOR(S) | : Shigang Chen et al. |

It is certified that error appears in the above-identified patent and that said Letters Patent is hereby corrected as shown below:

ON THE TITLE PAGE, ITEM (56) IN OTHER PUBLICATIONS

Page 2, lines 1 and 2  Remove duplicate cited reference "Kim et al., Simple and fault-tolerant key agreement for dynamic collaborative groups. Nov. 2000. ACM. pp. 235-244.*"

Claim 26, column 20, line 54, italicize letters     Replace "g" with --*g*--
Claim 26, column 20, line 55, italicize letters     Replace "p" with --*p*--
Claim 26, column 20, line 57, italicize letters     Replace "g" with --*g*--
Claim 26, column 20, line 57, italicize letters     Replace "p" with --*p*--
Claim 26, column 20, line 58, italicize letters     Replace "L" with --*L*--
Claim 26, column 20, line 62, correct symbols and italicize Replace "$x_j$, jϵM" with --$x_j$, *j*ϵ*M*--
Claim 26, column 20, line 64, italicize letters     Replace "R" with --*R*--
Claim 26, column 21, lines 1-5, correct symbols Delete symbol and replace with

$$-- X_{L+R} = (g^{\prod_{j \in L+R} x_j}) \bmod p \; --$$

Claim 26, column 21, lines 7-11, correct symbols Delete symbol and replace with

$$-- X_M = (X_{l+R})^{x_l} \bmod p = g^{\prod_{j \in M} x_j} \bmod p = K \; --$$

UNITED STATES PATENT AND TRADEMARK OFFICE
CERTIFICATE OF CORRECTION

PATENT NO. : 7,096,356 B1
APPLICATION NO. : 09/894721
DATED : August 22, 2006
INVENTOR(S) : Shigang Chen et al.

It is certified that error appears in the above-identified patent and that said Letters Patent is hereby corrected as shown below:

Claim 27, column 21, lines 22-25, correct symbols Delete symbol and replace with

$$-- X_R = g^{\prod_{j \in R} x_j} \mod p --$$

Claim 27, column 21, lines 30-34, correct symbols Delete symbol and replace with

$$-- X_{R+\{i\}} = (X_R)^{x_i} \mod p = g^{\prod_{j \in R+\{i\}} x_j} \mod p --$$

Signed and Sealed this

Sixteenth Day of September, 2008

JON W. DUDAS
*Director of the United States Patent and Trademark Office*